(12) United States Patent
Marvit et al.

(10) Patent No.: US 8,762,530 B2
(45) Date of Patent: Jun. 24, 2014

(54) PEER-TO-PEER NETWORK WITH PAID UPLOADERS

(75) Inventors: Dave Marvit, San Francisco, CA (US);
Kenji Nagahashi, Fremont, CA (US);
Hitoshi Matsumoto, San Jose, CA (US);
Albert Reinhardt, Albany, CA (US)

(73) Assignee: Fujitsu Limited, Kawasaki (JP)

( * ) Notice: Subject to any disclaimer, the term of this patent is extended or adjusted under 35 U.S.C. 154(b) by 1093 days.

(21) Appl. No.: 11/518,248

(22) Filed: Sep. 11, 2006

(65) Prior Publication Data
US 2008/0065771 A1    Mar. 13, 2008

(51) Int. Cl.
*G06F 15/173* (2006.01)
*G06F 15/16* (2006.01)

(52) U.S. Cl.
USPC ............................. 709/226; 709/223; 709/229

(58) Field of Classification Search
USPC .......................................... 709/226, 223, 229
See application file for complete search history.

(56) References Cited

U.S. PATENT DOCUMENTS

| | | | | |
|---|---|---|---|---|
| 7,356,487 | B2 * | 4/2008 | Kitze | 705/26.3 |
| 2002/0178255 | A1 | 11/2002 | Hobart | |
| 2002/0194108 | A1 | 12/2002 | Kitze | |
| 2003/0061287 | A1 * | 3/2003 | Yu et al. | 709/205 |
| 2004/0249643 | A1 * | 12/2004 | Ouyang et al. | 705/1 |
| 2005/0234864 | A1 * | 10/2005 | Shapiro | 707/1 |
| 2005/0289011 | A1 * | 12/2005 | Sporny | 705/26 |
| 2006/0007955 | A1 * | 1/2006 | Kotzin | 370/467 |
| 2006/0031548 | A1 * | 2/2006 | Funchess | 709/231 |
| 2006/0080238 | A1 * | 4/2006 | Nielsen et al. | 705/40 |
| 2006/0206486 | A1 * | 9/2006 | Strickland | 707/9 |
| 2007/0061863 | A1 * | 3/2007 | Rajasekaran | 726/2 |
| 2007/0174471 | A1 * | 7/2007 | Van Rossum | 709/229 |

FOREIGN PATENT DOCUMENTS

| | | |
|---|---|---|
| EP | 1 458 165 A2 | 9/2004 |
| JP | 2003-281140 | 10/2003 |
| JP | 2003-346000 | 12/2003 |
| JP | 2004-80236 | 3/2004 |
| JP | 2004-303012 | 10/2004 |
| JP | 2005-222189 | 8/2005 |
| JP | 2006-72432 | 3/2006 |
| JP | 2006-120063 | 5/2006 |
| JP | 2008-533613 | 8/2008 |
| WO | WO 2005065026 A2 * | 7/2005 |

OTHER PUBLICATIONS

European Search Report dated Feb. 4, 2008 for corresponding European Patent Application No. 07012843.4.
BitTorrent, Wikipedia, printout dated Jul. 19, 2006, 13 pages.

(Continued)

*Primary Examiner* — Viet Vu
*Assistant Examiner* — Herman Belcher
(74) *Attorney, Agent, or Firm* — Staas & Halsey LLP

(57) ABSTRACT

A peer-to-peer network in which a respective uploaders is paid for uploading content in accordance with a request for the content by a respective downloader. More specifically, the respective uploader is paid an amount determined in accordance with quality of service factors committed to in advance of the uploading by the respective uploader, quality of service factors actually provided to the respective downloader by the respective uploader or a quality of service requested by the respective downloader. A central system reconciles payment from the respective uploader, to a respective downloader and to a content rights holder.

22 Claims, 14 Drawing Sheets

(56) References Cited

OTHER PUBLICATIONS

About Peer Impact™, printout from http://www.peerimpact.com/about.html, printout dated Jul. 19, 2006, 1 page.
Movies, Peer Impact™, printout from http://www.peerimpact.com/movies.html, printout dated Jul. 19, 2006, 1 page.
Home, Peer Impact™, printout from http://www.peerimpact.com, printout dated Jul. 19, 2006, 2 pages.
FAQ, Peer Impact™, printout from http://www.peerimpact.com/faq.html, printout dated Jul. 19, 2006, 4 pages.
Extended European Search Report, mailed Apr. 21, 2008 and issued in corresponding European Patent Application No. 07012843.4-2413.
European Patent Office Examination Report dated May 27, 2011 for corresponding European Patent Application No. 07012843.4.
Japanese Office Action mailed Feb. 14, 2012 issued in corresponding Japanese Patent Application No. 2007-226501.

* cited by examiner

PEER-TO-PEER NETWORK WITH PAID UPLOADERS

BACKGROUND OF THE INVENTION

Peer-to-peer (or P2P) networks are used to distribute files, such as audio, video or data files. A peer-to-peer networks primarily relies on the computer power and bandwidth of the participants (or "peers") in the network, rather than concentrating power and bandwidth in a relatively low number of servers. For example, BIT TORRENT is a company that provides peer-to-peer network enabling technologies.

Content rights holders need a way to distribute their content. Therefore, some content rights holders are interested in the use of a peer-to-peer network for this purpose.

However, content rights holders are concerned about controlling their content in a world where perfect digital copies can be made easily and then transmitted around the world for free in seconds. Content rights holders fear that if consumers are given access to the content, piracy will flourish and market share of the content rights holders will be undermined. Therefore, content rights holders are concerned about their content being available in digital form. They may be especially concerned when the content is available on a peer-to-peer network where digital copies are easily made and distributed by peers without control by, or compensation to, the content rights holders.

Therefore, to encourage distribution of content on peer-to-peer networks, the interests of content rights holders and peers should be more closely aligned. One way to do this is to require peers that download content to pay for it, and to also compensate peers for uploading content. With this approach, uploading peers will have an economic disincentive for distributing content for free against the wishes of the content rights holders. Downloading peers will have an economic incentive to becoming an uploading peer that gets compensated to distribute the content that they previously downloaded.

PeerImpact.com is a peer-to-peer network with compensates uploading peers and requires downloading peers to pay for downloading content.

However, there is a need for further refinement of peer-to-peer networks to further align the interests of the content rights holders and the peers, and to operate the networks more efficiently.

SUMMARY OF THE INVENTION

Various embodiments of the present invention provide, for example, a method for use with a peer-to-peer network connecting uploaders of content to downloaders of content, the method including paying a respective uploader for content uploaded by the respective uploader in accordance with a request for the content by a respective downloader. The respective uploader is paid an amount determined in accordance with quality of service factors committed to in advance of the uploading by the respective uploader, quality of service factors actually provided to the respective downloader by the respective uploader or a quality of service requested by the respective downloader.

Various embodiments of the present invention also provide, for example, a method for use with a peer-to-peer network connecting uploaders of content to downloaders of content, the method including: (a) requesting content by a respective downloader; (b) uploading content by a respective uploader in accordance with the request by the respective downloader; (c) downloading the uploaded content by the respective downloader; (d) communicating between a central system and the respective uploader to provide the central system with information from the respective uploader relating to the uploading by the respective uploader; (e) communicating between the central system and the respective downloader to provide the central system with information from the respective downloader relating to the downloading by the respective downloader; and (f) automatically reconciling, by the central system, payment to the respective uploader for the uploaded content, payment by the respective downloader for the downloaded content and payment to a content rights holder for the content uploaded by the respective uploader and downloaded by the respective downloader, in accordance with the information provided to the central system from the respective uploader and the information provided to the central system from the respective downloader, and thereby ensuring that the payments are consistent with the actual uploading by the respective uploader and the actual downloading by the respective downloader. The payment to the respective uploader is determined, for example, in accordance with availability of the uploaded content on the network in addition to quality of service factors committed to in advance of the uploading by the respective uploader, quality of service factors actually provided to the respective downloader by the respective uploader or a quality of service requested by the respective downloader. Moreover, the availability of the uploaded content is based, for example, on a number of copies of the uploaded content available on the network at a given time and quality of service factors committed by the uploaders.

Moreover, various embodiments of the present invention provide, for example, a method for use with a peer-to-peer network connecting uploaders of content to downloaders of content, the method including requiring a respective downloader to pay for content downloaded by the respective downloader and provided by a respective uploader in accordance with a request for the content by the respective downloader. The respective downloader is required to pay an amount determined in accordance with availability of the downloaded content on the network and a quality of service requested by respective downloader in advance of the downloading. The availability of the downloaded content is based, for example, on a number of copies of the downloaded content available on the network at a given time and quality of service factors committed by the uploaders.

Further, various embodiments of the present invention provide, for example, a method for use with a peer-to-peer network connecting uploaders of content with downloaders of content, the method including (a) obtaining commitments for quality of service factors from the uploaders; and (b) communicating, by a central system, with a respective downloader and a respective uploader in accordance with a request by the respective downloader for content, to allow the respective uploader to upload content and the respective downloader to download content in accordance with the obtained commitments to satisfy the request.

In addition, embodiments of the present invention provide, for example, a method for use with a peer-to-peer network connecting uploaders of content with downloaders of content, the method including (a) obtaining commitments for quality of service factors from the uploaders; (b) communicating, by a central system, with a respective downloader and a respective uploader in accordance with a request by the respective downloader for streaming content at a quality of service selected by the respective downloader, to allow the respective uploader to upload content and the respective downloader to download content in accordance with the obtained commitments to satisfy the request; (c) communicating between a central system and the respective uploader to provide the central system with information from the respective uploader relating to the uploading by the respective uploader; (d) communicating between the central system and the respective downloader to provide the central system with information from the respective downloader relating to the downloading by the respective downloader; and (e) reconciling, by the central system, payment to the respective uploader for the uploaded content, payment by the respective downloader for the downloaded content and payment to a content rights holder for the content uploaded by the respective uploader and downloaded by the respective downloader, in accordance with the information provided to the central system from the respective uploader and the information provided to the central system from the respective downloader, and thereby ensuring that the payments are consistent with the actual uploading by the respective uploader and the actual downloading by the respective downloader.

Further, embodiments of the present invention provide, for example, a method for use with a peer-to-peer network connecting uploaders of content to downloaders of content, the method comprising preseeding uploaders with content.

The above description is not intended to be applicable to every embodiment of the present invention. Instead, the above description is intended as example embodiments.

BRIEF DESCRIPTION OF THE DRAWINGS

Reference will now be made in detail to embodiments of the present invention, examples of which are illustrated in the accompanying drawings.

DETAILED DESCRIPTION OF THE PREFERRED EMBODIMENTS

Figure 1:
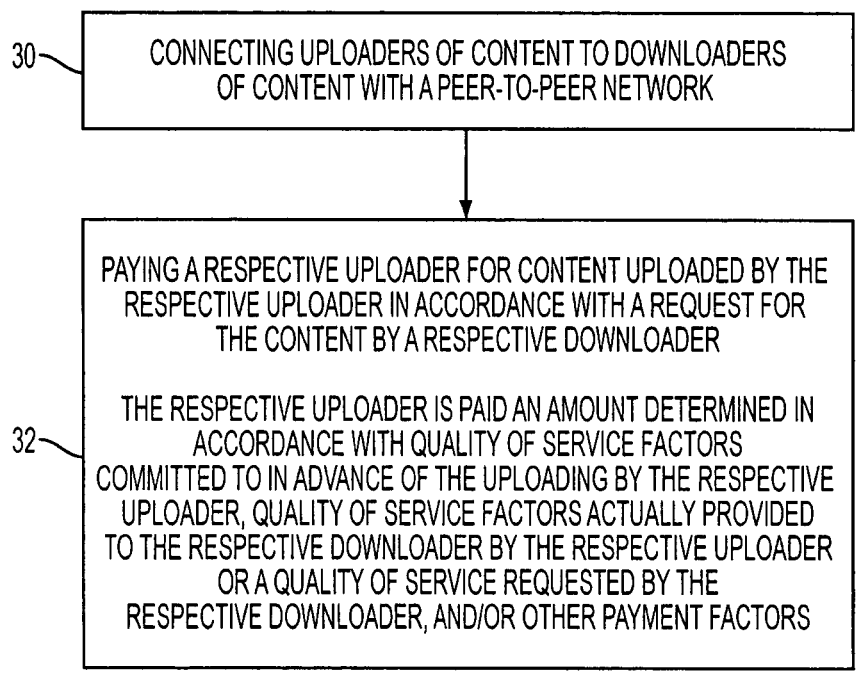
FIG. 1 is a diagram illustrating a process for paying uploaders in a peer-to-peer network, according to an embodiment of the present invention.

FIG. 1 is a diagram illustrating a process for paying uploaders in a peer-to-peer network, according to an embodiment of the present invention. Referring now to FIG. 1, in operation 30, uploaders of content are connected to downloaders of content with a peer-to-peer network. Here, "uploaders" are end users, or "peers", of the peer-to-peer network who transmit the content, and "downloaders" are end-users, or "peers", of the peer-to-peer network who receives the content. The concepts of "uploaders", "downloaders" and "peers" in a peer-to-peer network are known.

Moreover, in various embodiments of the present invention described herein, a respective uploader is described as uploading content requested by a respective downloader. Depending on the requested content, one or more uploaders might be used to satisfy the request. For example, a request for a large file (such as, for example, a video file) might be satisfied by a plurality of uploaders uploading segments or portions that together satisfy the request. Therefore, although a respective uploader may be described herein as satisfying a request, it should be understood that various embodiments of the present invention as described herein are applicable to situations in which a plurality of uploaders upload content to satisfy a request for content by a downloader.

Referring again to FIG. 1, from operation 30, the process moves to operation 32, where a respective uploader is paid for content uploaded by the respective uploader in accordance with a request for the content by a respective downloader. For example, the respective uploader is paid an amount determined in accordance with quality of service factors committed to in advance of the uploading by the respective uploader. Or, the respective uploader is paid in accordance with quality of service factors actually provided to the respective downloader by the respective uploader. Alternatively, the respective uploader is paid in accordance with a quality of service requested by the respective downloader.

As previously indicated, the downloaded content may be provided to the respective downloader by a plurality of uploaders. For example, different uploaders might upload different portions or segments of the content. The respective downloader downloads these different portions or segments, and thereby obtains the entire content. The above-described ways of paying uploaders applies to situations in which a single uploader uploads content to satisfy a request by a downloader, or to situations in which a plurality of uploaders upload portions or segments of the content to satisfy the request.

Moreover, when a plurality of uploaders provide content to satisfy a request, the payments to the respective uploaders might take into consideration an aggregate quality of service actually received by the respective downloader. For example, a respective uploader might be paid in accordance with quality of service factors actually provided to the respective downloader by the respective uploader, taking into consideration the aggregate quality of service actually received by the respective downloader. As an example, a respective uploader might be paid a higher amount for provide specific quality of service factors if the aggregate quality of service actually provided to the respective downloader is high, as compared to if the aggregate quality of service actually provided to the respective downloader is low. There are many other ways to take into consider the aggregate quality of service, and the present invention is not limited to any particular way.

Here, quality of service factors are factors which affect the quality of service provided by an uploader or received by a downloader. Quality of service factors include, for example, the amount of bandwidth provided by the uploader, the amount of time that bandwidth is provided by the uploader, the day that bandwidth is provided by the uploader, the time of day that bandwidth is provided by the uploader, the amount of guaranteed uptime by the uploader, etc. These are only examples of quality of service factors. The present invention is not limited to these examples.

Therefore, as indicated above, the respective uploader might be paid an amount determined in accordance with quality of service factors committed to in advance of the uploading by the respective uploader. As an example, the respective uploader might have guaranteed to provide a specific amount of bandwidth at a specific time on a specific day. The respective uploader might, for example, be compensated a higher amount if the specific day is a day at which downloads are expected to be higher than normal. The present invention is not limited to any specific algorithm for determining compensation based on the committed quality of service factors. Many different algorithms can be used.

Moreover, as indicated above, the respective uploader might be paid in accordance with quality of service factors actually provided to the respective downloader by the respective uploader. The quality of service factors actually provided might be different from those guaranteed in advance. For example, an uploader may actually provide less bandwidth than originally guaranteed. In this case, the payment to the uploader would reflect the quality of service factors that were actually provided. In some embodiments, the uploader may be penalized if the quality of service factors actually provided were less than committed. Such penalty might include, for example, a reduction in payment for uploaded content or reductions in future payments for future uploads. Therefore, the uploader is being paid in accordance with the extent to which commitments for quality of service factors were actually honored.

In addition, as indicated above, the respective uploader might be paid in accordance with a quality of service requested by the respective downloader. For example, a downloader might be offered the option of several different bandwidths or times of day for downloading. The uploader might be paid an amount determined in accordance with an option selected by the downloader.

In addition, as indicated in operation 32, a respective uploader might also be paid in accordance with other payment factors. Such other payment factors might include, but are not limited to, for example, a membership level or other marketing promotion, the geography of the uploader and/or downloader, bandwidth availability for content other than the specific content requested by the respective downloader, age of the requested content, the type of device on which the uploader and/or downloader is operating (for example, whether the downloader is operating on a PDA or a PC), etc. There are many other payment factors that can be used, and the present invention is not limited to any specific payment factors. Moreover, the use of such payment factors can be used with other embodiments of the present invention described herein.

Therefore, generally, according to various embodiments of the present invention, the uploader is paid in accordance with factors other than those based solely on what content was uploaded by the uploader or what content was downloaded by the downloader.

Therefore, as more specific examples, uploaders can be paid based on a variety of criterion including, but not limited to: (1) the bandwidth with which they upload, (2) the time of day or week or month or year in which their upload(s) take place, (3) the amount of data which they upload, (4) quality of service factors which they are willing to commit, and the extend to which that commitment is honored, (5) the amount that the downloader is paying for the content, and (6) any combination of these factors.

As an example, if a respective uploader is willing to commit to make a segment of a movie available on short notice at high bandwidth during prime time and delivers on this commitment, then that uploader might be compensated more than another uploader who provides just as much data but at a lower bandwidth or at a later time, or even at the same bandwidth and time, but having been unwilling to commit to doing so.

In some embodiments of the present invention, if a respective uploader fails to meet a commitment, then penalties could be exacted. The failed commitment might be based on service spread across some time period or some number of uploads, segments or bits. Therefore, as previously indicated, the uploader might be paid in accordance with the extent to which commitments for quality of service factors were actually honored.

Uploaders might be paid (that is, compensated), for example, in the form of actual monies, or in the form of credits that can be used for additional content or other exchanges (in a manner similar to frequent flier miles). There are many different types of consideration that can be used to pay the uploader, and the present invention is not limited to any specific type of consideration. More specifically, the uploader is not limited to being paid in money. Moreover, uploaders can be paid in a different form than that paid by downloaders. For example, downloaders may be required to pay in money, whereas uploaders may be paid in credits.

Figure 2:
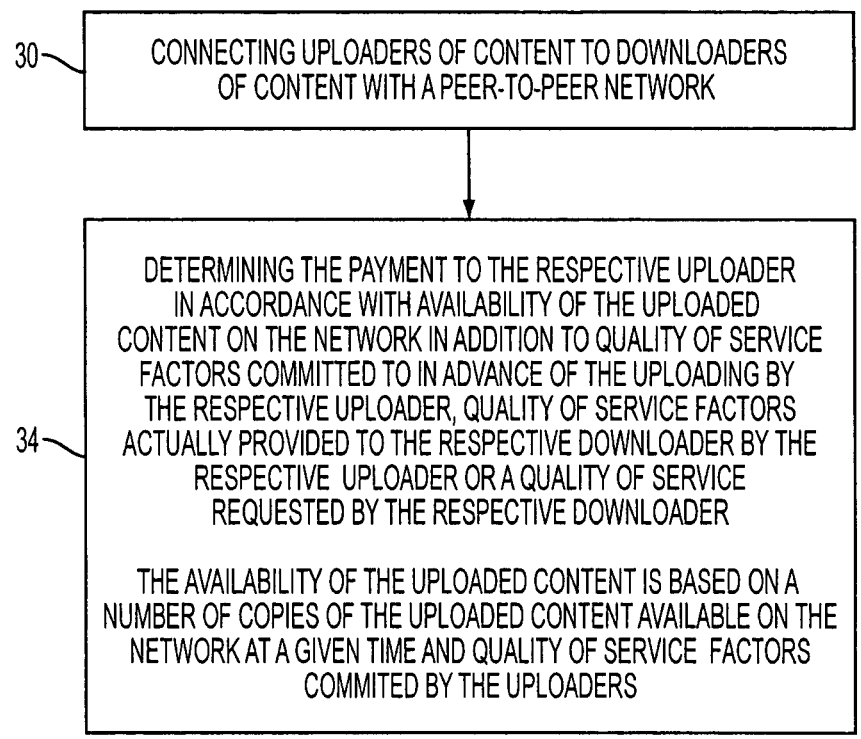
FIG. 2 is a diagram illustrating a process for paying uploaders in a peer-to-peer network, according to an additional embodiment of the present invention.

FIG. 2 is a diagram illustrating a process for paying uploaders in a peer-to-peer network, according to an additional embodiment of the present invention. Referring now to FIG. 2, in operation 34, the payment to the respective uploader is determined in accordance with availability of the uploaded content on the network in addition to quality of service factors committed to in advance of the uploading by the respective uploader, quality of service factors actually provided to the respective downloader by the respective uploader or a quality of service requested by the respective downloader. Moreover, as with other embodiments of the present invention described herein, the uploader can be also paid in accordance with other payment factors as described with reference to operation 32 in FIG. 1.

The availability of the uploaded content is based, for example, on a number of copies of the uploaded content available on the network at a given time. The availability of the uploaded content might also be based on quality of service factors committed by the uploaders. For example, availability might be based on the number of copies available during a specific time period on a specific day, taking into consideration the amount of bandwidth committed by the uploaders during that specific time period on that specific day. However, there are other ways to determine the availability of the uploaded content, and the present invention is not limited to any particular way.

Therefore, according to embodiments of the present invention, supply and demand on the network can be effectively managed, and behavior of the uploaders and downloaders can be effectively managed, by managing the compensation paid to the uploaders and setting the required payments for downloads by the downloaders. Embodiments of the present invention as described herein are much more effective in such management as compared to simply paying a fixed amount to uploaders for uploading content and setting a fixed amount that downloaders are required to pay for downloading content.

In a peer-to-peer network in which uploaders are paid for uploading content, it is important to accurately reconcile payments from downloaders, payments to uploaders, and payments to content rights holders.

Figure 3:
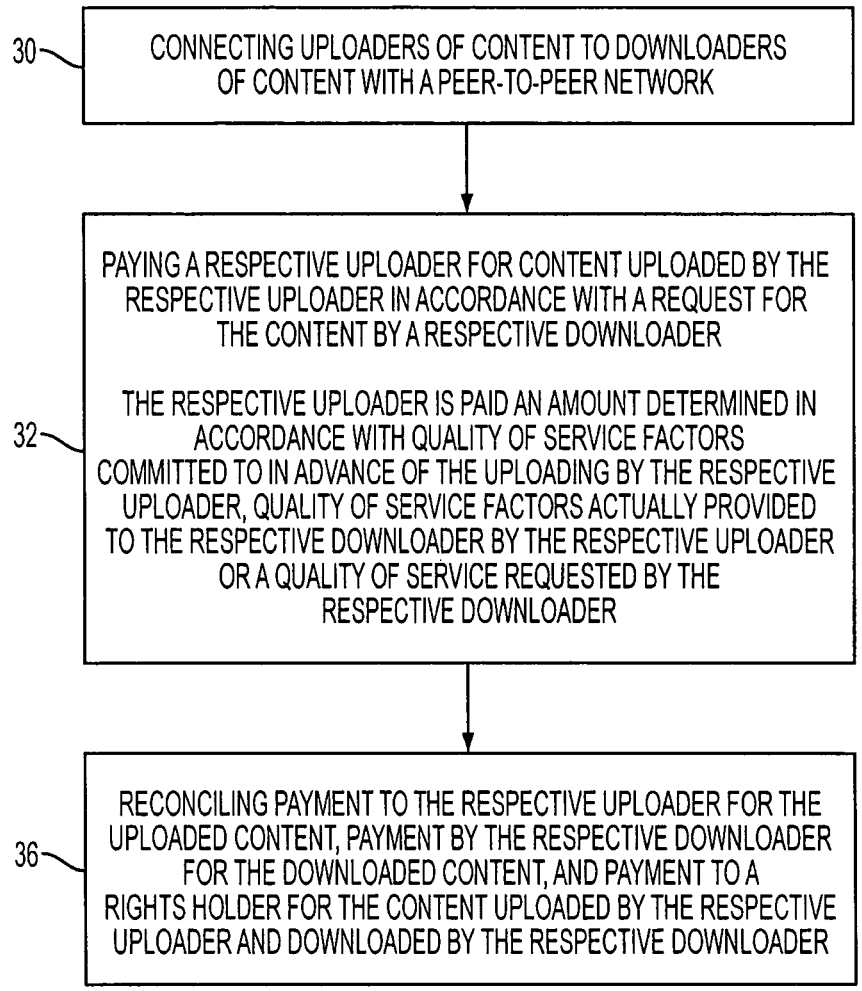
FIG. 3 is a diagram illustrating a process for reconciling payments in a peer-to-peer network, according to an embodiment of the present invention.

For example, FIG. 3 is a diagram illustrating a process for reconciling payments in a peer-to-peer network, according to an embodiment of the present invention. The process in FIG. 3 is similar to the process in FIG. 1, but includes operation 36 of reconciling, by a central system, payment to the respective uploader for the uploaded content, payment by respective downloader for the downloaded content, and payment to a content rights holder for the content uploaded by the respective uploader and downloaded by the respective downloader. Operation 36 ensures that the payments are consistent with the actual uploading by the respective uploader and the actual downloading by the respective downloader. More specifically, operation 36 ensures that payments are consistent with the actual transaction that occurred.

For example, when uploaders A, B and C have uploaded content that is downloaded by a downloader D, each uploader A, B and C will send the central system information about, for example, what content was uploaded by the respective uploader, when the content was uploaded by the respective uploader, at what bandwidth the content uploaded by the respective uploader, and what was the distribution over time of the content uploaded by the respective uploader. Uploaders A, B and C may send a subset of this information, or some portion of this information with additional information. Of course, these are only examples of information sent to the central system, and embodiments of the present invention are not limited in any way to this particular information.

Downloader D will also send analogous information to the central system. The central system will then compare the information from the uploaders A, B and C, and from the downloader D, and then allocate payments accordingly. Although information relating to commitments for quality of service factors may be shared between uploaders A, B and C and the downloader D, in some embodiments such information will only be exchanged between the central system and the uploaders.

In addition, in various embodiments of the present invention, the central system might receive payment for services provided by the central system.

Figure 4:
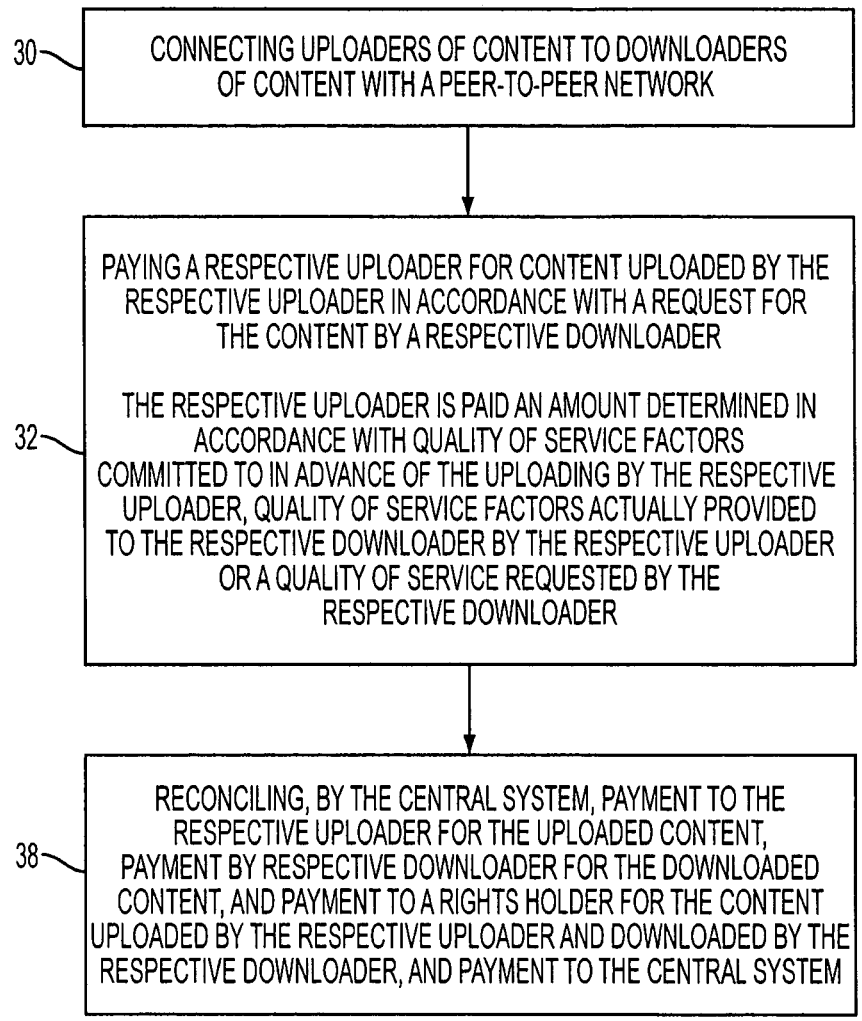
FIG. 4 is a diagram illustrating a process for reconciling payments in a peer-to-peer network, according to an embodiment of the present invention.

For example, FIG. 4 is a diagram illustrating a process for reconciling payments in a peer-to-peer network, according to an embodiment of the present invention. The process in FIG. 4 is similar to the process in FIG. 3, but includes, in operation 38, reconciling, by a central system, payment to the central system. This payment may come from the downloaders, from the uploaders and/or from the content providers. As an example, the central system might receive a small percentage of the amounts paid by downloaders. However, the present invention is not limited to this example, and there are many ways to compensate the central system.

In various embodiments of the present invention, the central system can, for example, track many factors and vary both the amount that uploaders are paid, the amount that downloaders are required to pay, and even potentially the amount that content rights holders are paid. These factors, which can be used in any combination, might include but are not limited to:

(1) The resolution (that is, "technical quality") of the content. For example, a downloader may be required to pay more for higher resolution content. Payments to the uploader and the content rights holder might be adjusted accordingly.

(2) The time of day, week, month or year in which the uploading by the uploader and the downloading by the downloader takes place. This is most applicable to streaming video-on-demand (VOD). In this case, the downloader might be required, for example, to pay more to watch a movie streamed in "prime time" than at some other time. Payments to the uploader and the content rights holder might be adjusted accordingly.

(3) The supply/demand ratio of the content. For example, a downloader might be required to pay more for content that is in high demand, and less for content that is in low demand. Payments to the uploader and the content rights holder might be adjusted accordingly.

(4) The supply/demand ratio of bandwidth in the network at the time a download request is made or the content is delivered. For example, if the supply of bandwidth is low, the uploader might be paid higher for uploading content as compared to when the supply of bandwidth is high. Payments required by the downloader and the content rights holder might be adjusted accordingly.

(5). The overall level of demand, independently of the supply. For example, when demand for content is high, a downloader might be required to pay more as compared to when the demand for that content is low. Payments to the uploader and the content rights holder might be adjusted accordingly.

(6) The age of the content. The age might be computed since, for example, its initial release. For example, a downloader might be required to pay less for older content. Payments to the uploader and the content rights holder might be adjusted accordingly.

(7) The individual uploader and/or downloader, or their demographic or geographic type. Payments to/from other parties might be adjusted accordingly.

(8) The fraction and portion of the content desired. For example, downloaders may only want specific segments of a movie. These downloaders might be required to pay less for downloading only a specific segments as opposed to the entire content file. Payments to the uploader and the content rights holder might be adjusted accordingly.

(9) The device onto which the content is being loaded. For example, a downloader might be required to pay different amounts based on whether the content is downloaded to a TV or a handheld personal digital assistant (PDA). Payments to the uploader and the content rights holder might be adjusted accordingly. Of course, embodiments of the present invention are not limited to any particular device.

(10) The format of the data. For example, a downloader might be required to pay different amounts, and an uploader might be compensated different amounts, for data in .wmv format verses .rm format. Payments to the content rights holder might be adjusted accordingly. Of course, embodiments of the present invention are not limited to any particular format.

(11) Whether additional components of the content data stream are provided, such as, but not limited to, (a) subtitles, (b) 5.1 sound versus simple stereo, (c) special features such as interviews, "making of" documentaries, etc., (d) content in editable format. Payments to each of the parties might be adjusted accordingly.

(12) Usage and re-usage rights. Payments to each of the parties might be adjusted accordingly.

Of course, embodiments of the present invention are not limited to the above-described factors or examples. Moreover, each transaction for an upload and corresponding download would typically involve an uploader, a downloader, a content rights holders and the central system. The above-described factors could be applied to determine payments to/from each of these parties. For example, as indicated above, a downloader might be required to pay more for content that is in high demand, and less for content that is in low demand. Conversely, the uploader might be paid more to upload content that is in high demand, and less for content that is in low demand. Similarly, the content rights holder might be paid more for content that is in high demand, and less for content that is in low demand. A percentage paid to the central system might be higher for content that is in high demand, and less for content that is in low demand. These types of incentives can help balance supply and demand on the network.

Algorithms could easily be developed based on the above-described factors to determine payments from the downloaders, payments to the uploaders, payments to the content rights holders, and payments to the central system. As a simple example of an algorithm, a downloader might be required to pay $5 to download a movie on a Sunday, but only $4 to download the same movie on a Monday. Of the paid amount, 90% might go to the content rights holder, 8% might go to a single uploader that uploaded the entire movie or be shared among all uploaders that participated in uploading the move, and 2% might go to the central system. Of course, this is only one example of an algorithm, and the present invention is not intended to be limited in any way by this example.

For example, there are various different ways in which payment to the content rights holders can be determined to encourage certain economic activity.

The following are possible examples for use in formulating algorithms which may be beneficial from the point of view of content rights holders:

(1) The content rights holders receive a fixed payment for each download of content.

(2) Implement an ASCAP model where the popularity/significance of a work would automatically credit the content rights holder with higher/different rates of payment.

(3) Implement models that leverage the central control of the central system, to determine the amount of payment required by a downloader and from which the content rights holder receives payment. For example, the downloader might be required to pay more during peak hours (e.g., prime time), more for ad free content, more for different resolutions, etc.

(4) Implement profit sharing for sampling. For example, end users ("peers") could generate a collage of content or generate original content using pieces of existing content combined with original content (sampling). Instead of having to pay onerous licensing fees, the end users could take advantage of a licensing system in which their revenues would be automatically shared with the originator of the content segments. For example, if someone used a clip from a specific movie in their work, then $0.02 of every $1 they receive in revenue might go to the owner of the intellectual property rights of the movie.

The following are possible examples for use in formulating algorithms which may be beneficial from the point of view of uploaders:

(1) Share content and make money or made credits (analogous to frequent flier miles) to be applied to additional content acquisition. These credits can generate an entire secondary market.

(2) Some content holders have a strong agenda and are more concerned about getting their content widely distributed than they are about generating revenue. Such a content holder may be willing to pay uploaders a greater portion of the downloaders payment in order to get content on many machines for efficient and rapid downloading. This will have a different set of performance and economic characteristics than merely reducing the price of a download. A related strategy would be to have a low price for the first N downloads where N is an integer larger enough to "seed" the community of uploaders. Finally, the price may be a function of the number of previous downloads and other factors (such as the date, demand fluctuation, etc.) so that some optimization of revenue can be realized.

(3) Uploaders may want to scour the Internet with "bots" to find the best return on investment (ROI) for content. An uploader can then determine what content is likely to make the uploader the most money if the uploader provides it, independent of the uploader's personal interest in that content, or weighed against the uploaders interest in that content. This will help dynamically balance out the supply with the demand. The next level in this reasoning is to have the uploader's bot present the uploader with several things that the uploader could downloader and decide which the uploader would be most interested in viewing and then hosting.

The following are possible examples for use in formulating algorithms which may be beneficial from the point of view of central system:

(1) The central system might receive small license fees from the content rights holders. The central system might prefer to become as small and transparent as possible. The central system might be seen as being similar to an ASCAP or a BMI that pays for operating costs.

(2) The central system might get paid to provide some kind of ad insertion in, before, or after content.

(3) The central system might receive a small cut of the proceeds paid by the downloaders. The central system might charge content rights holders for participation and/or charge end users ("peers", such as uploaders and/or downloaders) for participation. This might involve taking some small portion of the payments to the uploaders (that is, the uploaders' distribution fees).

(4) The central system might leverage the network's distribution capacity for grid computing applications that is then sold/rented.

(5) The central system might use search and retrieval services as a revenue generator, similar to GOOGLE or YAHOO.

(6) The central system might place ads in program guides. Basically this amounts to providing meta-data and stuffing it with advertisements.

(7) The central system might charge extra if it provides enough connections to stream instead of just downloading, or if it simply supports downloading at certain speeds.

(8) The central system might implement ad targeting based upon user behavior.

(9) The central system might charge for placement of content onto hard drives so that distribution can be expedited. The central system can, for example, place pieces of content on end-user drives without end-user involvement. This can be done as a background task so as not to interfere with the end-users' experience. This placement will help ensure that there are enough copies available for fast downloading or even streaming when the content is made publicly available. A fee could be legitimately charged (of the content rights holders) for this distribution service.

In some embodiments of the present invention, only the uploaders or only the downloader need to communicate with the central system, to thereby reduce the number of communications with the central system. The other party(s) information would typically be encrypted in such a way that the central system could decrypt it. For example, the encrypted information would be passed from the party that does not communicate with the central system to the party (or possibly more than one other party) that communicates with the central system, to be relayed to the central system. While encryption may be desirable, it is not necessary for information to be encrypted.

Accordingly, uploaders and downloaders have their provision and consumption corroborated by the other party. This corroboration is part of the reconciliation process that then plays out in the compensation process.

Figure 5:
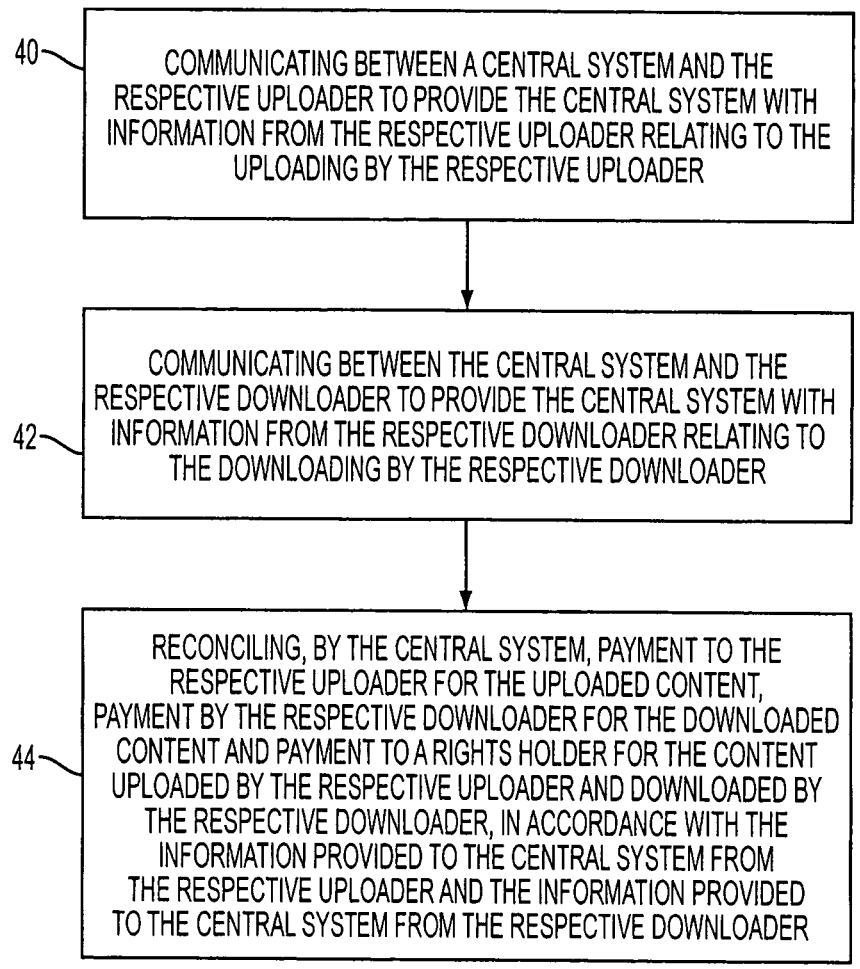
FIG. 5 is a diagram illustrating a more detailed process for reconciling payments in a peer-to-peer network, according to an additional embodiment of the present invention.

For example, FIG. 5 is a diagram illustrating a more detailed process for reconciling payments in a peer-to-peer network, according to an additional embodiment of the present invention.

Referring now to FIG. 5, in operation 40, communication is performed between a central system and a respective uploader to provide the central system with information from the respective uploader relating to the uploading by the respective uploader. Such information might include, for example, what specific content was uploaded, what day the content was uploaded, what time of the day the content was uploaded, what amount of bandwidth was provided for the upload by the uploader, etc. However, these are only examples of what information might be provided to the central system from the uploader, and the present invention is not limited to any particular type of information.

From operation 40, the process moves to operation 42, where communication is performed between the central system and the respective downloader to provide the central system with information from the respective downloader relating to the downloading by the respective downloader. Such information might include, for example, what specific content was downloaded, what day the content was downloaded, what time of the day the content was downloaded, what amount of bandwidth was used by the downloader for the download, etc. However, these are only examples of what information might be provided to the central system from the downloader, and the present invention is not limited to any particular type of information.

Although operation 42 is shown after operation 42, the order of these operations may be reversed, or the operations may be performed simultaneously.

From operation 42, the process moves to operation 44, where the central system reconciles payment to the respective uploader for the uploaded content, payment by the respective downloader for the downloaded content and payment to a content rights holder for the content uploaded by the respective uploader and downloaded by the respective downloader. The reconciliation is performed in accordance with the information provided to the central system from the respective uploader and the information provided to the central system from the respective downloader. Such payments would typically be made electronically by the central system. However, the present invention is not limited to electronic payment from or into accounts of the respective uploader, the respective downloader and the content rights holder. Moreover, the present invention is not limited to electronic payment into separate accounts. Instead, there are many ways to make payments, and the present invention is not limited to any particular way.

Therefore, in operation 44, the central system ensures that the payments are consistent with the actual uploading by the respective uploader and the actual downloading by the respective downloader by checking the information provided to the central system from the uploader in operation 40 and from the downloader in operation 42.

As an example, the information provided to the central system by the respective uploader might indicate that 10 Mb of data was uploaded on Aug. 1, 2006, at approximately 10:00 pm. The central system can then check to determine whether the information provided to the central system from the respective downloader is consistent with that provided by the respective uploader If the information is consistent, the central system can then make or authorize the appropriate payments.

Reconciliation would typically be performed automatically by the central system. Throughout this application, "automatically" indicates that a process is performed in an automated manner by computers without human intervention. For example, reconciliation would typically be performed automatically by a central system. However, in some embodiments, if there is a problem in reconciling the payments, then human intervention may be involved. As an example, if the information provided to the central system from the downloader in operation 42 is not sufficiently consistent with the information provided to the central system from the uploader in operation 40, the central system may require human assistance to resolve discrepancies. For example, the central system may send a notice to the downloader and/or the uploader to telephone a customer assistance representative to resolve problems. However, there are many ways in which humans can be involved in the reconciliation of payments, and the present invention is not limited to any particular way.

Various embodiments of the present invention are described herein as relating to paying an uploader. This uploader is only one party to a transaction. However, each transaction has at least one other party, such as a downloader, a content rights holder and/or a central server which must pay or be paid or make a payment. Although all viewpoints of a transaction with respect to each of these parties might not be explicitly described herein, such viewpoints would be implicit in various embodiments of the present invention.

Figure 6:
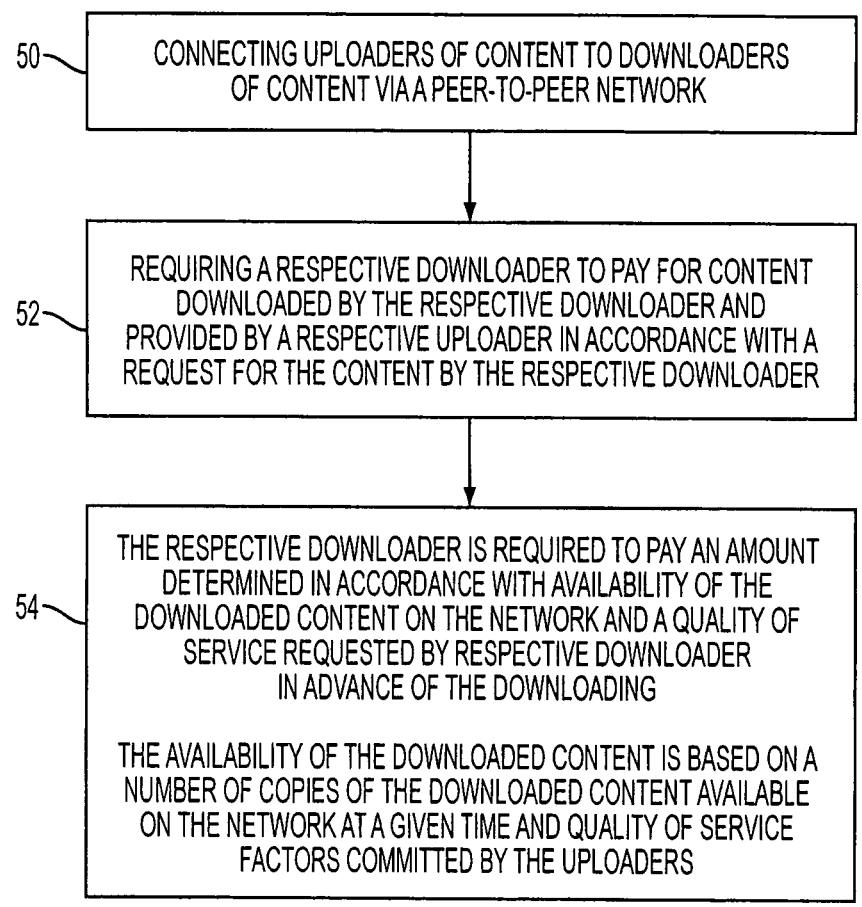
FIG. 6 is a diagram illustrating a process for requiring a downloader to pay for a download, according to an embodiment of the present invention.

For example, whereas FIGS. 1-5 are generally directed from the point of view of paying of an uploader, FIG. 6 is a diagram illustrating a process for requiring a downloader to pay for a download, according to an embodiment of the present invention.

Referring now to FIG. 6, in operation 50, uploaders of content are connected to downloaders of content via a peer-to-peer network.

From operation 50, the process moves to operation 52, where a respective downloader is required to pay for content downloaded by the respective downloader and provided by a respective uploader in accordance with a request for the content by the respective downloader. As indicated in operation 54, the respective downloader is required to pay an amount determined, for example, in accordance with availability of the downloaded content on the network and a quality of service requested by respective downloader in advance of the downloading. The availability of the downloaded content is based, for example, on a number of copies of the downloaded content available on the network at a given time and quality of service factors committed by the uploaders.

However, there are many different ways to determine an amount a downloader is required to pay, and the present invention is not limited to any particular way. Moreover, there are many different ways to determine availability of the downloaded content, and the present invention are not limited to any particular way.

Embodiments of the present invention can be applied to peer-to-peer networks used to distribute any types of files, including audio, video or data files. However, the distribution of video files poses especially difficult problems and challenges, due to the size of such files.

For example, many types of conventional peer-to-peer networks require a file to be entirely downloaded before the file can be used. This makes real-time viewing, or "streaming", of video content (or even audio content) impractical. This requirement of many types of conventional peer-to-peer networks is due to limitations on reliable bandwidth and on the availability of segments of content needed. Moreover, in some conventional peer-to-peer networks, files are downloaded based on availability, but not necessarily in the order in which they would appear in the completed file. Such out-of-order downloading of files can cause problems with streaming video content, especially with video-on-demand (VOD) streaming video content.

According to embodiments of the present invention, these problems can be solved by obtaining commitments for quality of service factors from uploaders and/or offering downloaders different downloading options in accordance with the commitments, to thereby effectively manage the uploading and downloading of video content.

Figure 7:
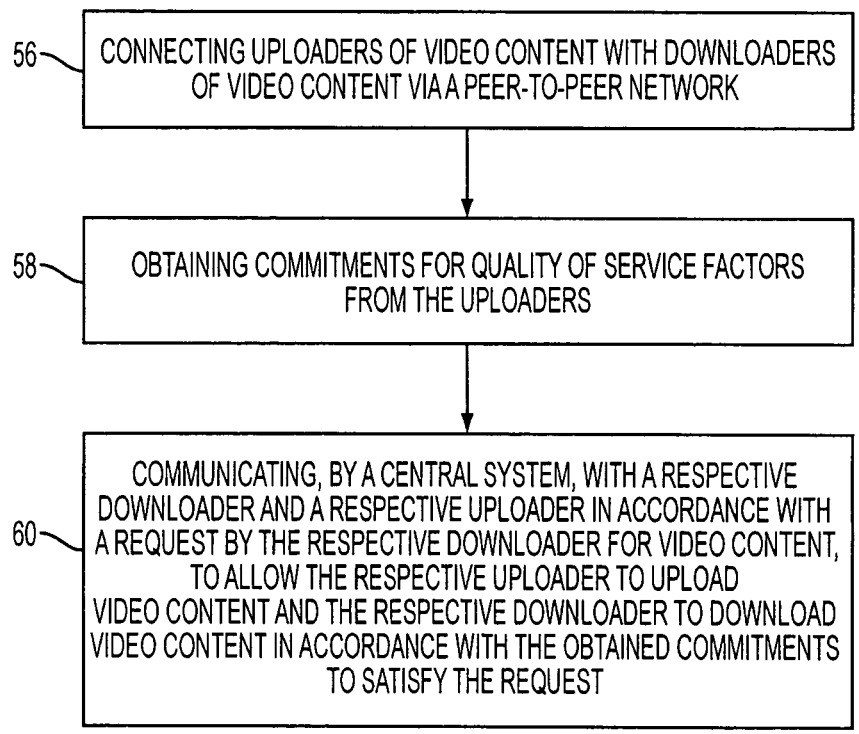
FIG. 7 is a diagram illustrating a process in which commitments for quality of service factors are obtained from uploaders in a peer-to-peer network, according to an embodiment of the present invention.

For example, FIG. 7 is a diagram illustrating a process in which commitments for quality of service factors are obtained from uploaders in a peer-to-peer network, according to an embodiment of the present invention. Referring now to FIG. 7, in operation 56, uploaders of video content are connected with downloaders of video content via a peer-to-peer network.

From operation 56, the process moves to operation 58, where commitments for quality of service factors are obtained from the uploaders. For example, a central system might obtain commitments from uploaders to, for example, provide specific content at a specific bandwidth during a specific time on a specific day. Of course, these are only examples of quality of service factors, and the present invention is not limited to any specific examples.

Although operation 58 is shown after operation 56, the order of these operations can be reversed.

From operation 58, the process moves to operation 60, where the central system communicates with a respective downloader and a respective uploader in accordance with a request by the respective downloader for video content, to allow the respective uploader to upload video content and the respective downloader to download video content in accordance with the obtained commitments to satisfy the request. For example, the central system uses its knowledge to direct the respective uploader to a respective downloader that can satisfy the request, based on the obtained commitments.

In various embodiments of the present invention, the central system will also know the demand for specific content based, for example, on requests from downloaders. Therefore, in various embodiments of the present invention, the central system would have enough information to sufficiently determine supply and demand on the network. For example, the central system might be able to determine the supply and demand conditions for specific content during a specific time on a specific day. As a more detailed example, the central system could combine its knowledge of (1) how many segments of a specific content are available, (2) the current demand for each content segment, (3) the bandwidth available for distributing each content segment, and (4) how far from initiation of content utilization those segments would be needed. For example, segments at the beginning of a movie might be needed right away in order to start streaming the movie, whereas segments from later in the movie could be received more slowly. Of course, this is only an example of information which might be known to a central system, and the present invention is not limited to any specific example and any specific type of knowledge.

Based on the knowledge of the central system, the central system can make appropriate offers to downloaders to balance supply and demand on the network.

Figure 8:
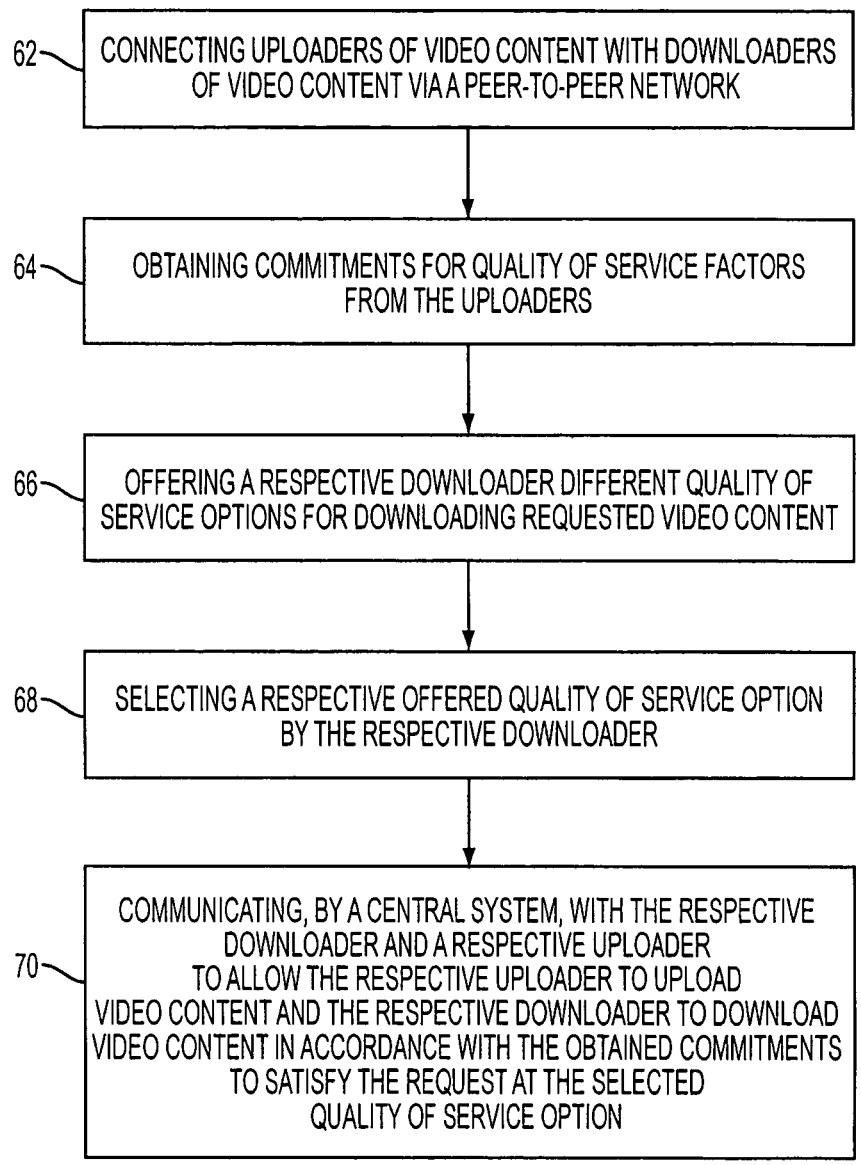
FIG. 8 is a diagram illustrating a process of in which commitments for quality of service factors are obtained from uploaders, and different offers are made to downloaders, in a peer-to-peer network, according to an additional embodiment of the present invention.

For example, FIG. 8 is a diagram illustrating a process of in which commitments for quality of service factors are obtained from uploaders, and different offers are made to downloaders, in a peer-to-peer network, according to an additional embodiment of the present invention. Referring now to FIG. 8, in operation 62, uploaders of video content are connected with downloaders of video content via a peer-to-peer network.

From operation 62, the process moves to operation 64, where commitments for quality of service factors are obtained from the uploaders by, for example, a central system. Although operation 64 is shown after operation 62, the order of these operations could be reversed.

From operation 64, the process moves to operation 66, where a respective downloader is offered different quality of service options for downloading video content requested by the downloader. The offer is made, for example, by the central system.

For example, as indicated above, the central system obtains commitments for quality of service factors from the uploaders. The central system might also know, for example, the demand for specific content, based on requests from downloaders. Therefore, the central system can obtain information to sufficiently determine supply and demand on the network.

Based on this determination, the central system might be able to determine, for example, if there is adequate probability of successfully streaming requested content to a respective downloader that the content could be treated as VOD. If there is an adequate probability of success, an offer for VOD service might be presented to the respective downloader. For example, the respective downloader might be provided with an offer of "CLICK TO PAY AND START THE MOVIE".

As an additional example, the central system might be able to determine, for example, if the requested content could be treated as VOD with some initial delay. If the requested content could be treated as VOD with some initial delay, an offer for this service might be presented to the respective downloader. For example, the respective downloader might be provided with an offer of "CLICK TO PAY, THEN WAIT 5 MINUTES AND THEN YOU WILL BE ABLE TO SEE THE ENTIRE MOVE".

As a further example, the central system might be able to determine, for example, if the requested content can be considered as VOD with some probability that it might have pauses in the body of the content and have this probability exposed to the respective downloader. For example, the respective downloader might be provided with an offer of "CLICK TO PAY, THEN YOU WILL HAVE AN 85% CHANCE OF SEEING THE MOVIE WITHOUT INTERRUPTION, OR WIAIT 1 MINUTE AND YOU WILL HAVE

A 90% CHANCE, OR WAIT 3 MINUTES AND YOU WILL HAVE A 97% CHANCE, OR . . . ".

Moreover, some combination of these determinations and their associated interfaces presented to downloaders could be used. For example, a respective downloader might be presented with an offer of "CLICK TO PAY: YOU CAN START THE MOVIE IMMEDIATELY AND HAVE AN 85% CHANCE OF SEEING THE MOVING WITHOUT INTERRUPTION, OR WAIT ONE (1) MINUTE AND YOU WILL HAVE A 90% CHANCE OF SEEING THE MOVIE WITHOUT INTERRUPTION, OR WAIT THREE (3) MINUTES AND YOU WILL HAVE A 97% CHANCE OF SEEING THE MOVIE WITHOUT INTERRUPTION."

As an additional example, the interface presented to the downloader might allow the downloader to enter a desired quality of service factor which is then used by the central system to finalize the offer. For example, the downloader could be presented with the following interface: "CLICK <fill in the blank> AND YOU WILL HAVE A (90% . . . 91% . . . 92%—determined by the central system) OF SEEING THE MOVIE WITHOUT INTERRUPTION." The percentage is determined by the central system, and increments upward as time passes. Conversely, the probability of failure might increment downward as time passes.

In another scenario, the downloader might have already agreed to pay, but had not yet selected a downloading option. In this case, the downloader might be presented with an option such as "YOU CAN START THE MOVIE IMMEDIATELY AND HAVE AN 85% CHANCE OF SEEING THE MOVING WITHOUT INTERRUPTION, OR WAIT ONE (1) MINUTE AND YOU WILL HAVE A 90% CHANCE OF SEEING THE MOVIE WITHOUT INTERRUPTION, OR WAIT THREE (3) MINUTES AND YOU WILL HAVE A 97% CHANCE OF SEEING THE MOVIE WITHOUT INTERRUPTION." The displayed information might then help the downloader decide when to start watching the movie.

If the downloader is provided with an option which allows the downloaded content to be viewed immediately (such as "CLICK TO PAY: YOU CAN START THE MOVIE IMMEDIATELY"), then the uploaders may be required to uploaded content, and the downloader may be required to begin downloading, before a decision to pay has been executed by the downloader. This can be done, for example, by automatically deleting the downloaded content if the downloader decides not to pay. An alternatively would be to download the content but not decrypt it unless the user pays. Moreover, to stream the content, only enough content needs to be downloaded to ensure the ability to stream the remainder of the content. Therefore, if the downloader decides not to pay, the downloaded content may not have much value without the remaining content.

Of course, the determinations and offers made to a downloader described above are only examples, and the present invention is not limited to these determinations and/or offers. Many different determinations and/or offers, and variations thereof, can be made.

Referring again to FIG. 8, from operation 66, the process moves to operation 68, where a respective offered quality of service option is selected by the respective downloader.

From operation 68, the process moves to operation 70, where the central system communicates with the respective downloader and a respective uploader in accordance with the request by the respective downloader for video content, to allow the respective uploader to upload video content and the respective downloader to download video content in accordance with the obtained commitments to satisfy the request at the selected quality of service option.

For example, based on the quality of service option selected by the respective downloader, the central server determines which respective uploader(s) would be appropriate for satisfying the selected option. The central server then directs the respective downloader to communicate with the respective uploader(s) to satisfy the request.

Accordingly, by obtaining commitments for quality of service factors from uploaders and offering downloaders different downloading options in accordance with the commitments, the central system can effectively manage supply and demand in a video-on-demand (VOD), streaming video, peer-to-peer network, while closely aligning the interests of content rights holders, uploaders and downloaders. Therefore, with embodiments of the present invention, peer-to-peer networks can effectively be used to distribute streaming VOD.

According to various embodiments of the present invention, in order to facilitate the rapid spread of digital content in a peer-to-peer network, content can be distributed in advance of its official release. For example, if some number of end-user machines (i.e., potential uploaders) had the content "pre-seeded" (that is, pre-loaded on their machines) before the public release of the content, then when the release date arrived the network could generate considerably more initial bandwidth to meet the demand for the new content. For example, if the content was a movie, the extend and geography of preseeding could be managed, for example, in accordance with marketing plans and expectations for the movie.

Therefore, the central system passes content to one or more preseeders, and then manages the further exchange of the content between peers until the content is adequately distributed. Preseeders may be compensated, for example, in part based on where they are in this chain of distribution. In addition, systems may be put in place, for example, to reward more reliable preseeders and other uploaders by modifying their place in the hierarchy.

Of course, it is sometimes worrisome to distribute content before the actual release date, as such distribution could compromise the timing of the release. Accordingly, according to embodiments of the present invention, the copies being distributed could be disabled until the appropriate conditions are met for release. Such appropriate conditions would typically be the date, but might also be tied to real world events such as corporate announcements, a birth or death, election result, natural disaster, etc.

This disabling could take many forms. These might include:

(1) Encrypting part or all of the content with a key (or, more generally, an algorithm) that is only made available when the conditions for release are met. Because the distribution of a key can be done rapidly based upon its small size such a system can still meet the needs of a timely response.

(2) Encrypting each "sliver" of data with a different key or a different algorithm.

(3) Using incomplete distribution with some part or parts of the data missing. The missing pieces could be distributed when the conditions are met.

(4) Partially corrupting data to render it useless. The corruption can be corrected, replaced or removed with a relatively small data flow.

(5) The full data could be distributed into the system but no individual would have a full set. By slicing the data fine enough, no single preseed uploader would have a useful dataset. In fact, having the data "sliced" up in this way might facilitate distribution because everyone would have to go online to get a complete set—thereby forcing the preseeded uploaders to make their portions of the content available even as they sought to collect the pieces that they were missing.

(6) Combinations of the above items (1) through (6) could also be used. For example, "slivers" of data that had been distributed can be encrypted.

An uploader that chooses (volunteers) to be a preseeder is not necessarily also a user of the content. Business models might exist in which peers might offer space on their devices for preseeding in exchange for uploading revenue or some other compensation without any intent to actually use the content themselves. This could be supported by a number of the disabling processes described above. For example, peers offering space on their devices might never get the key/algorithm or they never get the pieces that they are missing in order to "enable" the content. For example, in some embodiments, uploaders might be paid for preseeding even if they never receive a complete or usable version of the content. In this case, the preseeded uploaders truly become distribution partners in the complete sense. That is, they are distribution partners only, never consumers.

Therefore, uploaders that are preceeded might be paid for being preseeded.

In some embodiments of the present invention, uploaders might also pay to be preseeders because, for example, they may be guaranteed to have the movie available immediately upon release. This is only an example of a reason why uploaders might pay to be a preseeder, and the present invention is not limited to any specific reason.

Moreover, the central system could be paid for preseeding uploaders. For example, the central system might charge the content rights holders based on the nature and extent of the preseeding that is managed by the central system. Charges might be based, for example, on committed quality of service as well as the number of uploaders.

Preseeding does not necessarily require multiple direct downloads from the central system. Instead, the central system could pass along as few as one copy of the content to a single "uploader". (In this case the uploader would be downloading this initial copy from, for example, the central system or the content rights holder.) The central system could then manage the exchange of the file between that initial uploader and others willing to serve as preseeders.

Figure 9:
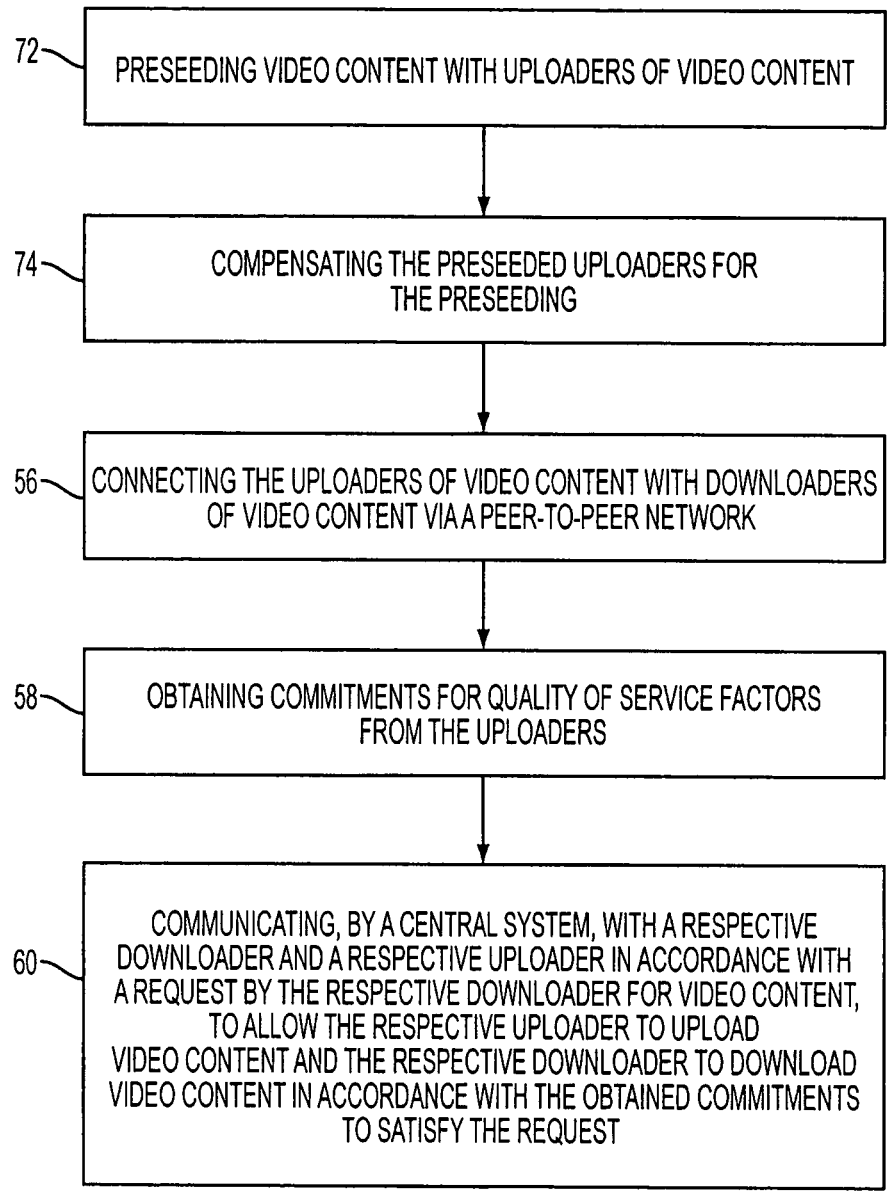
FIG. 9 is a diagram illustrating preseeding in a peer-to-peer network, according to an embodiment of the present invention.

FIG. 9 is a diagram illustrating preseeding in a peer-to-peer network, according to an embodiment of the present invention. FIG. 9 is similar to FIG. 7, but includes operations 72 and 74.

In operation 72, video content is preseeded with uploaders. There are many ways to preseed video content with uploaders, and the present invention is not limited to any particular way.

In operation 74, the preseeded uploaders are compensated for the preseeding. There are many ways to compensate uploaders for preseeding, and the present invention is not limited to any particular way.

Operation 74 is shown after operation 72. However, the order of these operations may be reversed.

Figure 10:
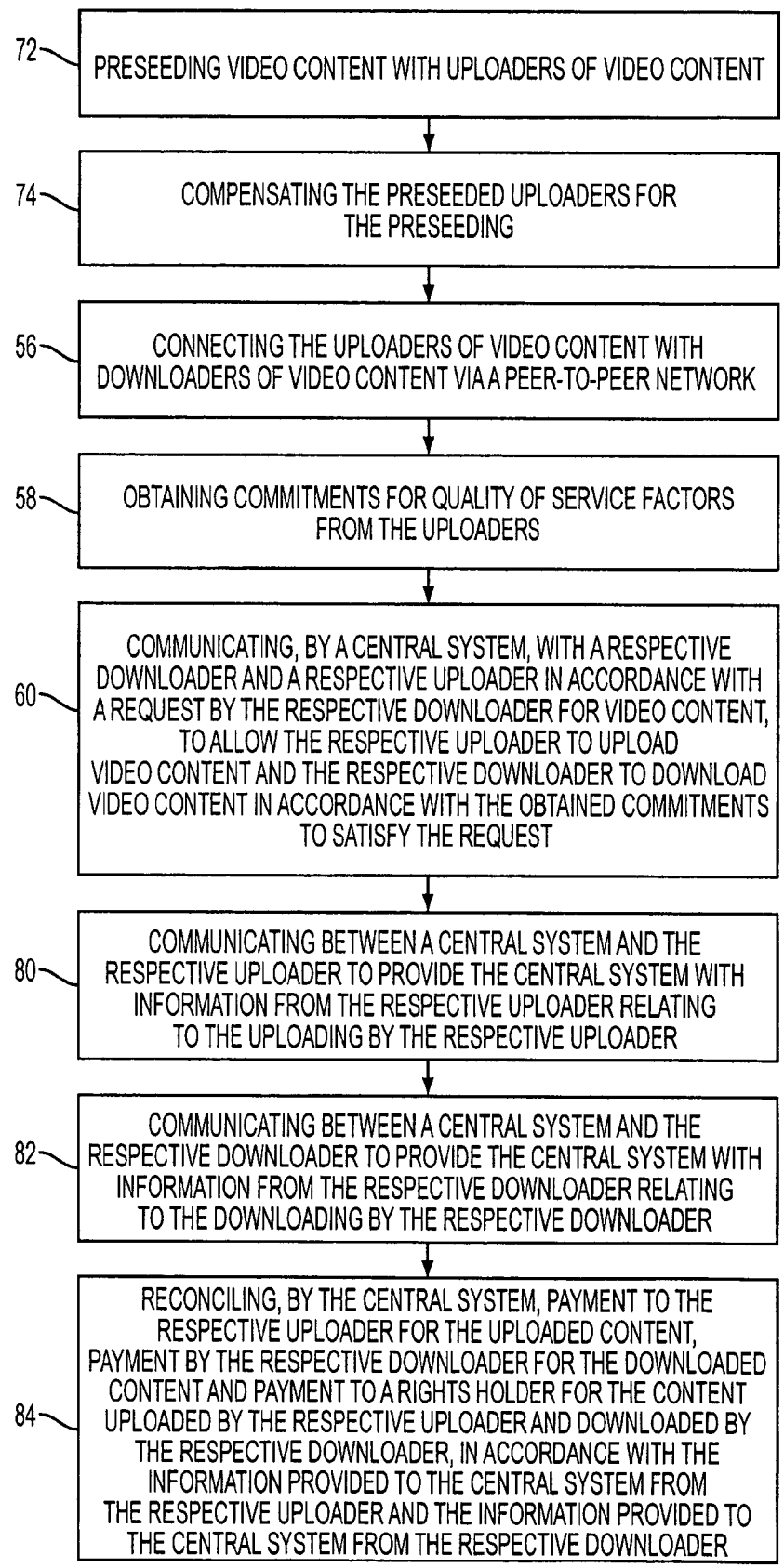
FIG. 10 is a diagram illustrating the reconciliation of payments by a central system in a peer-to-peer network, according to an embodiment of the present invention.

FIG. 10 is a diagram illustrating the reconciliation of payments by a central system in a peer-to-peer network, according to an embodiment of the present invention. FIG. 10 is similar to FIG. 9, but includes operations 80, 82 and 84.

In operation 80, communication between a central system and the respective uploader provides the central system with information from the respective uploader relating to the uploading by the respective uploader.

In operation 82, communication between the central system and the respective downloader provides the central system with information from the respective downloader relating to the downloading by the respective downloader.

Operation 82 is shown after operation 80, but the order of these operations may be reversed or these operations may occur simultaneously.

In operation 84, the central system reconciles payment to the respective uploader for the uploaded content and payment by the respective downloader for the downloaded content, in accordance with the information provided to the central system from the respective uploader and the information provided to the central system from the respective downloader. In some embodiments of the present invention, the central system might, for example, also reconcile payment to a content rights holder.

Figure 11:
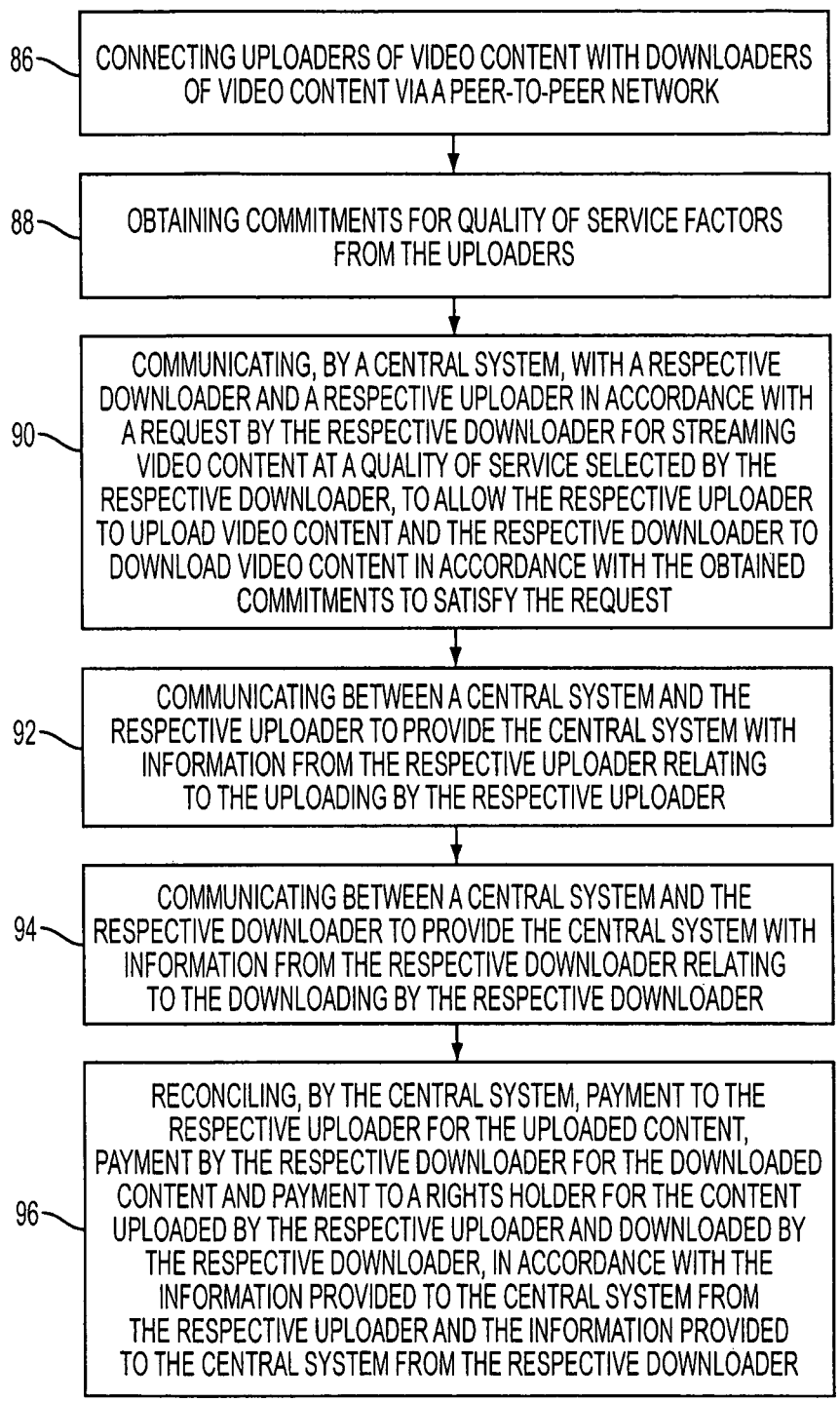
FIG. 11 is a diagram illustrating a process for providing streaming video content via a peer-to-peer network, according to an embodiment of the present invention.

FIG. 11 is a diagram illustrating a process for providing streaming video content via a peer-to-peer network, according to an embodiment of the present invention.

Referring now to FIG. 11, in operation 86, uploaders of video content are connected with downloaders of video content via a peer-to-peer network.

From operation 86, the process moves to operation 88, where commitments are obtained for quality of service factors from the uploaders. Although operation 88 is shown after operation 86, the order of these operations may be reversed.

From operation 88, the process moves to operation 90, where a central system communicates with a respective downloader and a respective uploader in accordance with a request by the respective downloader for streaming video content at a quality of service selected by the respective downloader, to allow the respective uploader to upload video content and the respective downloader to download video content in accordance with the obtained commitments to satisfy the request.

From operation 90, the process moves to operation 92, where communication between a central system and the respective uploader provides the central system with information from the respective uploader relating to the uploading by the respective uploader.

From operation 92, the process moves to operation 94, where communication between the central system and the respective downloader provides the central system with information from the respective downloader relating to the downloading by the respective downloader.

Although operation 94 is shown after operation 92, the order of these operations may be reversed or the operations may occur simultaneously.

From operation 94, the process moves to operation 96, where the central system reconciles payment to the respective uploader for the uploaded content, payment by the respective downloader for the downloaded content and payment to a content rights holder for the content uploaded by the respective uploader and downloaded by the respective downloader, in accordance with the information provided to the central system from the respective uploader and the information provided to the central system from the respective downloader.

Various processes with various operations are described herein, with the operations in a specific order. However, various of the operations can be performed in a different order than that explicitly shown in the figures.

Various type of peer-to-peer network architectures can be used to implement embodiments of the present invention, and the present invention is not limited to any particular type of architecture. However, embodiments of the present invention are easily implemented on architectures in which a central system operates in conjunction with a plurality of peers, each peer operating as an uploader and/or a downloader.

The present invention is not limited to the peers being any particular type of device. Therefore, a peer might be, for example, a desktop computer, a mobile computer, a personal digital assistant (PDA), a television (TV), a portable music or video device, a server, a wireless device and/or combinations of these, although a peer is not limited to these devices.

The following are examples of peer-to-peer networks implementing specific embodiments of the present invention. These examples uses various aspects of various embodiments described herein, and the present invention is not limited to these examples.

Figure 12:
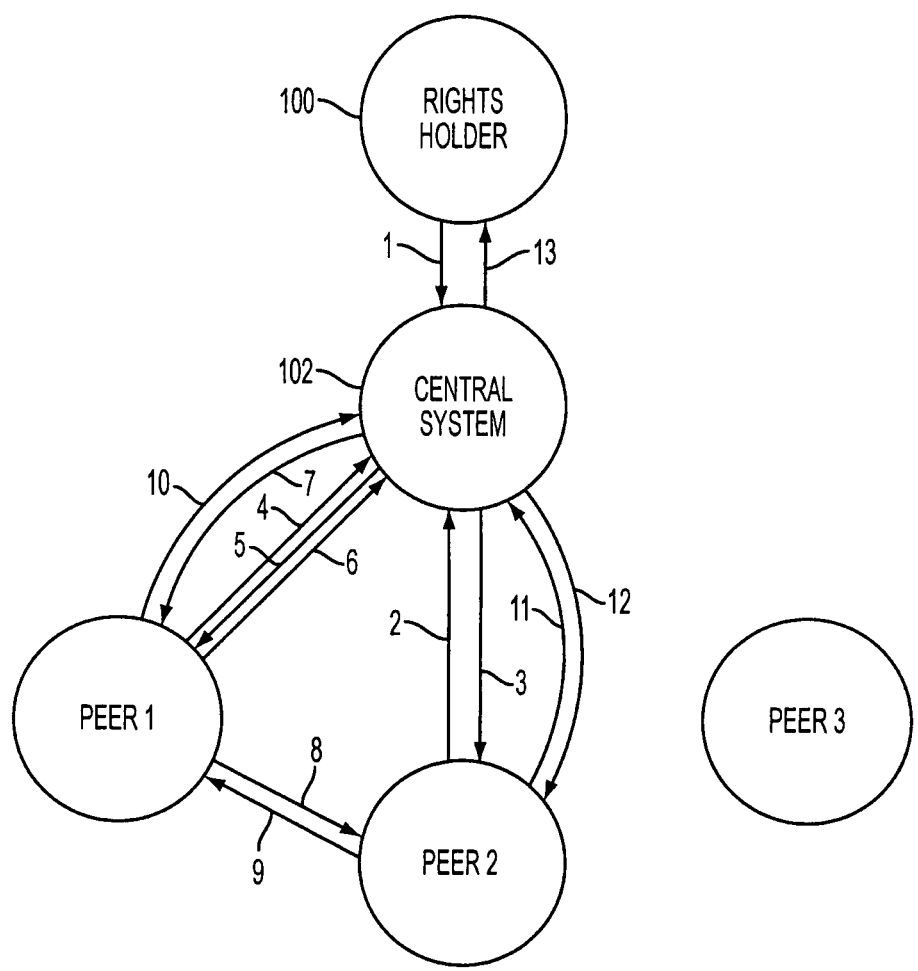
FIG. 12 is a specific example of the operation of a peer-to-peer network, according to an embodiment of the present invention.

For example, FIG. 12 is a specific example of the operation of a peer-to-peer network, according to an embodiment of the present invention. Referring now to FIG. 12, the peer-to-peer network includes a content rights holder 100, a central system 102, and peers 1, 2 and 3. FIG. 12 shows various communications 1 through 13.

In communication 1, content rights holder 100 provides content to the network by, for example, providing the content to central system 102. This initial copy of the content may reside on central system 102, although it could reside elsewhere and simply be pointed to as required. Moreover, instead of provide the content to central system 102, content rights holder 100 might provide content directly to a peer.

In communication 2, an end user (labeled here as "peer 2") requests a file. The request may be, for example, in response to information about the availability or pending availability of that file that is provided by central system 102 in an information exchange not represented in this figure.

In communication 3, central system 102 provides the file to peer 2.

In communication 4, peer 1 requests the file.

In communication 5, central system 100 provides information about payment options. This communication may be skipped in any of a variety of embodiments that would include various types of subscriptions, pre-agreed upon terms and so on.

In communication 6, peer 1 authorizes payment.

In communication 7, central system 102 sends peer 1 information about where this file can be found. In this example, this involves a pointer to peer 2. Central system 102 may also send information to peer 2 to expect a request from peer 1, although this communication is not represented in the figure. Moreover, communications between central system 102 and peers 1 and 2 can be used to ensure that only authorized exchanges take place. For example, if the central system 102 provides a transaction key to peers 1 and 2, then peer 1 (making the request for content) might provide that key to peer 2 as proof that the transaction is authorized. This is a method to prevent spoofing.

Simple variations might include having peer 2 pass the key given to it by peer 1 back to central system 102. Then central system 102 would check the validity of the key to determine the legitimacy of the transaction. If the transaction is deemed legitimate then central system 102 would authorize the transaction by sending some kind of approval to peer 2.

In addition, all of these exchanges could be secured by a variety of techniques including PKI, SSL, SSH, etc.

Moreover, the system can be reversed. More specifically, central system 102 can send information about peer 1 (the requester) to peer 2 (the provider). Then peer 1 would be called upon to initiate the peer-to-peer exchange.

In communication 8, peer 1 sends a request for information to be downloaded to peer 2. Peer 1 uses the pointer provided by central system 102 to know who to communicate with in order to get the desired data. Some of this information could be provided to peer 2 by central system 102 in order to maintain better control over the transaction.

In communication 9, peer 2 provides handshaking information, including what information it has received and what has been dropped.

In communication 10, peer 1 provides information to central system 102 describing in detail the information it received from peer 2 (such as the manner in which it was sent, including timeliness and bandwidth distribution over time). Although this would typically take place after the download has been completed, it could happen at multiple times during the course of the download. This would be especially useful as a protection against dropped connections.

In communication 11, peer 2 provides information to central system 102 describing the information it has provided to peer 1 (such as the manner in which it was sent, including timeliness and bandwidth distribution over time). However, this information may flow in a different manner. It may also flow encrypted from the recipient (here, peer 1) to the provider (here, peer 2). This encrypted data would then be sent to central system 102 along with data from the provider. This would reduce the number of communications with central system 102 and manage the incentive structure for transmission of data to central system 102. Of course, the roles of provider and recipient could also be reversed, with the provider sending information to the recipient (encrypted) for forwarding to central system 102.

In communication 12, central system 102 reconciles the information to make sure that the information that peer 2 claims to have sent is consistent with the information that peer 1 claims to have received. If the claims made by each peer match, then central system 102 releases payment to peer 2. This payment may take a variety of forms. If the claims do not match, then some alternative procedure is invoked to determine if and how payment should be allocated. This alternative procedure can be entirely automated, or could involve human intervention.

In communication 13, if the claims reconcile and the file has been provided to peer 1, then central system 102 disperses payment to content rights holder 100.

Figure 13:
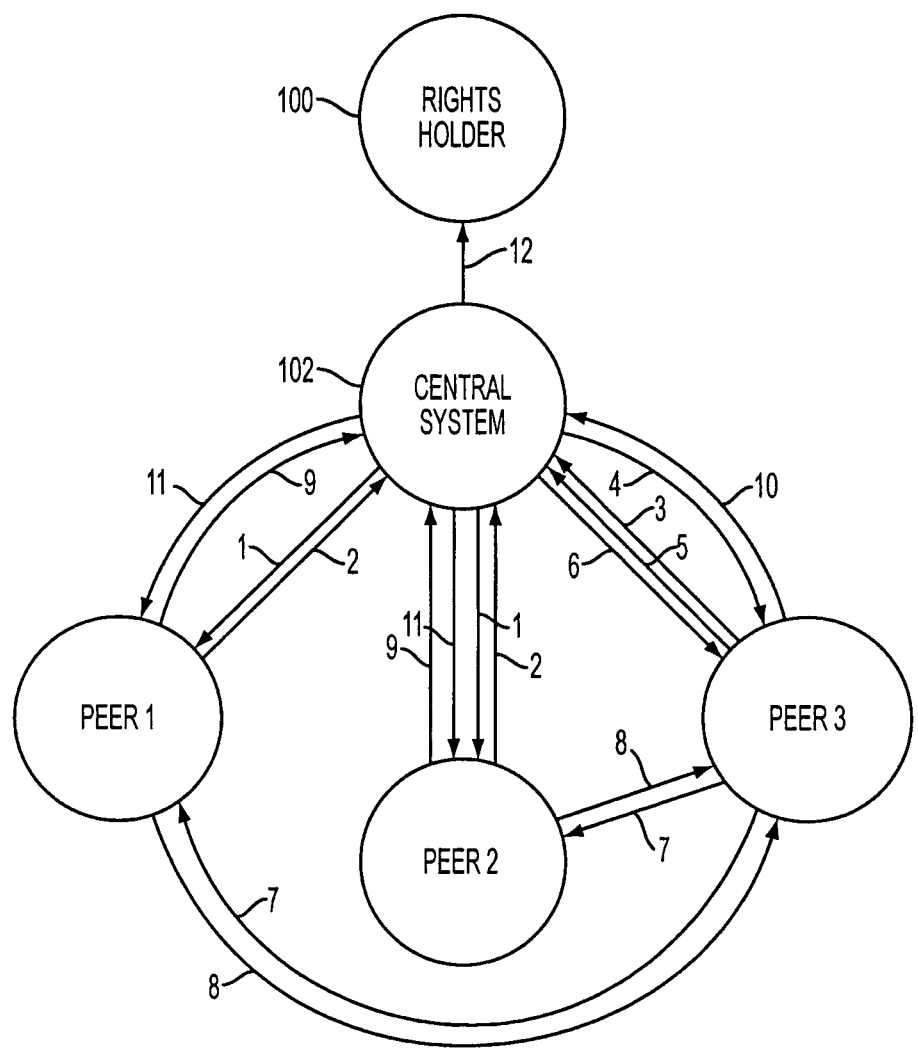
FIG. 13 is another specific example of the operation of a peer-to-peer network, according to an embodiment of the present invention.

FIG. 13 is another specific example of the operation of a peer-to-peer network, according to an embodiment of the present invention.

Referring now to FIG. 13, communication 1 represents the first half of an exchange between central system 102 can peers 1 and 2.

More specifically, central system 102 queries peers 1 and 2 as to their availability for a data exchange with some other requesting peer. Central system 102 may determine, for example, what content peers 1 and 2 have available to upload, what bandwidth they have available, and what bandwidth they are prepared to allocate to any given data exchange or set of exchanges, at what time and over what time period they are prepared to make what commitments, and possibly other factors such as, for example, their ping times to various locations on the network.

This may also be the first part of a negotiation between central system 102 and peers 1 and 2. This negotiation can involve, for example, levels of compensation for bandwidth commitments at different times. This is a negotiation over quality of service factors. This negotiation could also take the form of an auction for services at different service levels.

Communication 2 represents the other half of the exchange described in communication 1. Of course, there could be many more steps in this exchange than actually shown.

In communication 3, peer 3 requests some content from central system 102.

In communication 4, central system 102 provides pricing information to peer 3.

In communication 5, peer 3 agrees to pricing.

In communication 6, central system 102 provides information to peer 3 describing where it can download the requested data.

In communication 7, peer 3 initiates a data exchange with peers 1 and 2. In some embodiments, the data exchange may be initiated by peers 1 and 2.

In communication 8, the other half of the exchange initiated in communication 7 is conducted.

In communication 9, peers 1 and 2 provide information to central system 102 about the data they provided, the time course of that data provision, etc.

In communication 10, peer 3 provides information to central system 102 about the data it received. Communication 10 might occur before, or simultaneously with, communication 9.

In communication 11, central system 102 reconciles the assertions about data uploaded and data downloaded.

In communication 12, central system 102 pays rights holder 100.

Figure 14:
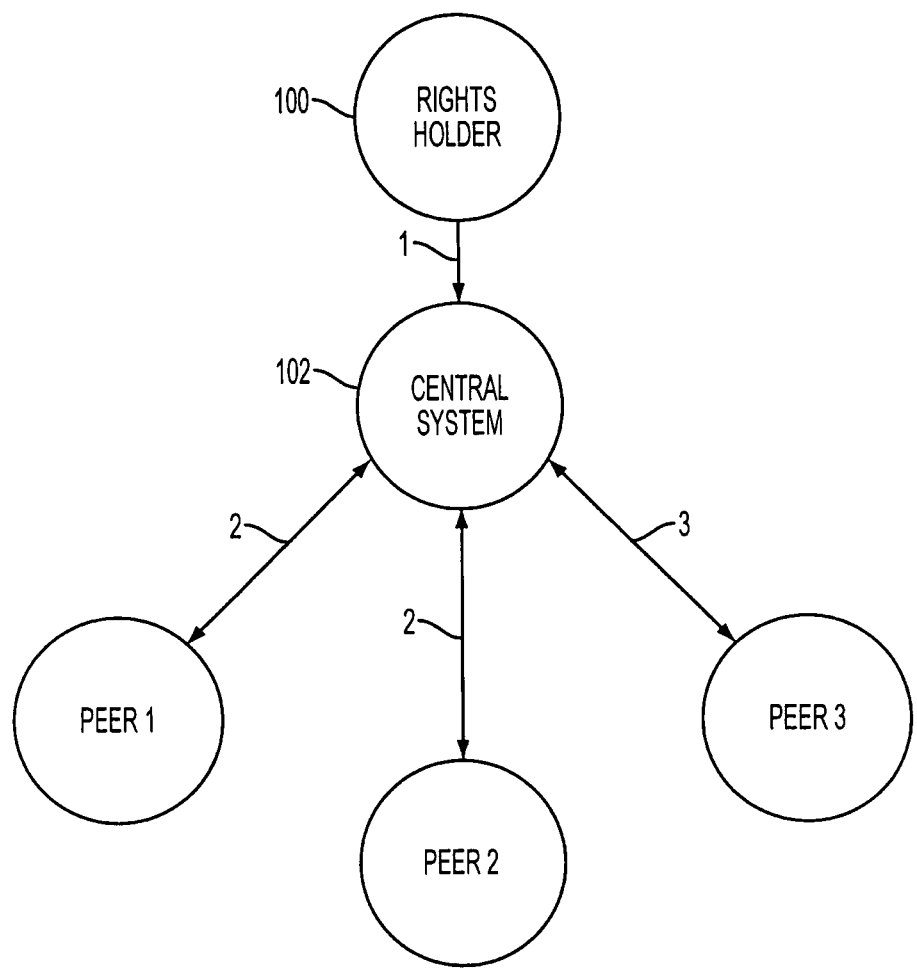
FIG. 14 is another specific example of the operation of a peer-to-peer network, according to an embodiment of the present invention.

FIG. 14 is another specific example of the operation of a peer-to-peer network, according to an embodiment of the present invention.

Referring now to FIG. 14, in communication 1, content is provided to central system 102 from content rights holder 100.

In communication 2, the content is preseeded into peers 1 and 2. Commitments for quality of service factors might also be obtained from peers 1 and 2 by central system 102. In this example, each peer does not necessarily have a complete and/or "working" version of the content.

In communication 3, peer 3 places a request for content. Because the content has been preseeded onto multiple peers, there will typically be more download bandwidth available as compared to the example in FIG. 12.

Remaining communications are similar to those described, for example, in FIG. 13.

FIGS. 12-14 are intended to be examples of embodiments of the present invention. The present invention is not limited to these specific examples. However, from these examples, it can be seen that the various embodiments of the present invention described herein can easily be implemented in a peer-to-peer network, especially a peer-to-peer network having a central system that communicates with peers and content holders.

Embodiments of the present invention are described herein as using a "central system". A "central system" is a computer, or a plurality of computers, at a conceptually central position with respect to the other involved parties, and thereby performs management operations with respect to the parties involved. For example, as described above, a central system might perform reconciliation of payments to/from the various parties. In addition to, or instead of, performing reconciliation, a central system might have an index indicating what content is stored on which peers, and would then perform file management of files on the network in accordance with the index. The present invention is not limited to any specific hardware/software configuration of a central system. Moreover, the term "central" does not imply a physically central location with respect to the physical location of any peers or other elements on the network. Therefore, a central system is essentially a management system that manages operations performed with respect to the different peers and, in some embodiments, with respect to content providers.

Although a "central system" is described herein as performing management of files on the network, and performing reconciliation, it is not necessary that the same central system perform both operations. For example, one central system might be used for management of files on the network, and a different central system might be used for reconciliation.

The above-described embodiments of the present invention can be applied to any type of digital content distribution. For example, embodiments of the present invention can be applied to the distribution of audio, video and/or data files, and any format. This includes, for example, software distribution.

The above-described embodiments of the present invention can be used in conjunction with digital rights management (DRM). For example, DRM can be applied to content distributed on the peer-to-peer network.

Various embodiments of the present invention are described individually herein, but are applicable in combinations. For example, reconciliation is described with respect to specific embodiments. However, reconciliation is applicable to other embodiments of the present invention described herein. As an additional example, preseeding is described with respect to specific embodiments. However, preseeding is applicable to other embodiments of the present invention described herein.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for use with a peer-to-peer network connecting uploaders of content to downloaders of content, the method comprising:

by at least one computer:

obtaining commitments for quality of service factors from the uploaders for uploading a same content, wherein the obtained commitments include different commitments for different quality of service factors from different uploaders, and the quality of service factors for which commitments are obtained from the uploaders are factors which affect quality of service provided by the uploaders or received by the downloaders;

requesting said same content by a respective downloader;

selecting a respective quality of service option from offered quality of service options by the respective downloader for downloading the requested content, wherein the offered quality of service options are options for quality of service available to the respective downloader for downloading the requested content;

determining a respective uploader to provide the requested content based on the selected quality of service option and the obtained commitments;

downloading the requested content at the selected quality of service option by the respective downloader and having been uploaded by the determined uploader with quality of service factors satisfying the selected quality of service option;

collecting payment from the respective downloader for the downloaded content at the selected quality of service option; and paying the determined uploader for the content uploaded by the determined uploader an amount determined in accordance with the quality of service option selected by the respective downloader and the quality of service factors actually provided by the determined uploader to upload the requested content.

2. The method as in claim 1, wherein said paying further comprises:
paying the determined uploader in accordance with availability of the content uploaded by the determined uploader on the network, wherein the availability of the content uploaded by the determined uploader on the network is based on a number of copies of the content uploaded by the determined uploader available on the network at a given time and quality of service factors committed by the uploaders.

3. The method as in claim 1, wherein
the actually provided quality of service factors include an amount of bandwidth provided by the determined uploader to upload the content.

4. The method as in claim 1, further comprising:
paying a content rights holder of the downloaded content from the collected payment.

5. The method as in claim 4, wherein said collecting payment, said paying the content rights holder, and said paying the determined uploader, are performed by a central system.

6. The method as in claim 1, further comprising:
reconciling payment to the determined uploader for the uploaded content, and payment by the respective downloader for the downloaded content, by a central system, and thereby ensuring that the payments are consistent with the actual uploading by the determined uploader and the actual downloading by the respective downloader.

7. The method as in claim 1, further comprising:
communicating between a central system and the determined uploader to provide the central system with information from the determined uploader relating to the uploading by the determined uploader;
communicating between the central system and the respective downloader to provide the central system with information from the respective downloader relating to the downloading by the respective downloader; and
reconciling, by the central system, payment to the determined uploader for the uploaded content and payment by the respective downloader for the downloaded content, in accordance with the information provided to the central system from the determined uploader and the information provided to the central system from the respective downloader, and thereby ensuring that the payments are consistent with the actual uploading by the determined uploader and the actual downloading by the respective downloader.

8. The method as in claim 7, wherein the information provided to the central system from the determined uploader includes quality of service factors actually provided by the uploader, and the information provided to the central system from the respective downloader includes quality of service received by the respective downloader.

9. The method as in claim 1, further comprising:
reconciling, by a central system, payment to the determined uploader for the uploaded content, payment by respective downloader for the downloaded content, and payment to a content rights holder for the content uploaded by the determined uploader and downloaded by the respective downloader, and thereby ensuring that the payments are consistent with the actual uploading by the determined uploader and the actual downloading by the respective downloader.

10. The method as in claim 1, further comprising:
communicating between a central system and the determined uploader to provide the central system with information from the determined uploader relating to the uploading by the determined uploader;
communicating between the central system and the respective downloader to provide the central system with information from the respective downloader relating to the downloading by the respective downloader; and
reconciling, by the central system, payment to the determined uploader for the uploaded content, payment by the respective downloader for the downloaded content and payment to a content rights holder for the content uploaded by the determined uploader and downloaded by the respective downloader, in accordance with the information provided to the central system from the determined uploader and the information provided to the central system from the respective downloader, and thereby ensuring that the payments are consistent with the actual uploading by the determined uploader and the actual downloading by the respective downloader.

11. The method as in claim 1, wherein
the peer-to-peer network is a video on demand (VOD) peer-to-peer network and the content is video content,
the committed the quality of service factors include a committed time and a committed bandwidth; and
the method further comprises:
communicating, by a central system, with the determined uploader and the respective downloader to allow the determined uploader to upload the content and the respective downloader to download the content in accordance with the obtained commitments.

12. The method as in claim 11, wherein said communicating allows the respective downloader to download and view the content as streaming video.

13. The method as in claim 1, wherein the determined uploader is paid in consideration other than money.

14. The method as in claim 1 wherein:
the quality of service factors include at least one of a committed time duration, a committed bandwidth, a committed time of day and a committed day.

15. The method as in claim 14, wherein the downloaded content is streaming content.

16. The method as in claim 1, further comprising:
preseeding content with the uploaders.

17. The method as in claim 16, further comprising:
compensating the preseeded uploaders for the preseeding.

18. The method as in claim 1, further comprising:
tracking factors to determine an amount to be collected from the respective downloader and an amount to be paid to the determined uploader, and
varying, in accordance with the tracked factors, the payment collected from the respective downloader by said collecting payment and the amount paid to the determined uploader by said paying.

19. The method as in claim 18, wherein the factors tracked by said tracking include a supply/demand ratio of the uploaded content.

20. The method as in claim 18, wherein the factors tracked by said tracking include a supply/demand ratio of bandwidth in the network.

21. A method for use with a peer-to-peer network connecting uploaders of content to downloaders of content, the method comprising:
obtaining commitments for quality of service factors from the uploaders for uploading a same content, wherein the obtained commitments include different commitments for different quality of service factors from different uploaders, and the quality of service factors for which commitments are obtained from the uploaders are factors which affect quality of service provided by the uploaders or received by the downloaders;

requesting said same content by a respective downloader;

offering to the respective downloader, by a central system, quality of service options for downloading the requested content, wherein the offered quality of service options are options for quality of service available to the respective downloader for downloading the requested content;

selecting a respective quality of service option from the offered quality of service options by the respective downloader;

determining, by the central system, a respective uploader to provide the requested content based on the selected quality of service option and the obtained commitments;

downloading the requested content at the selected quality of service option by the respective downloader and having been uploaded by the determined uploader with quality of service factors satisfying the selected quality of service option;

collecting payment from the respective downloader for the downloaded content at the selected quality of service option; and paying the determined uploader for the content uploaded by the determined uploader an amount determined in accordance with the quality of service option selected by the respective downloader and the quality of service factors actually provided by the determined uploader to upload the requested content, wherein said obtaining, said requesting, said offering, said selecting, said determining, said downloading, said collecting and said paying are performed by computers.

22. A method for use with a peer-to-peer network connecting uploaders of content to downloaders of content, the method comprising:

obtaining, by a central system of the peer-to-peer network, commitments for quality of service factors from the uploaders for uploading a same content, wherein the obtained commitments include different commitments for different quality of service factors from different uploaders, and the quality of service factors for which commitments are obtained from the uploaders are factors which affect quality of service provided by the uploaders or received by the downloaders;

offering, by the central system, to a respective downloader requesting said same content, quality of service options for downloading the requested content, wherein the offered quality of service options are options for quality of service available to the respective downloader for downloading the requested content;

determining, by the central system, a respective uploader to provide the requested content based on a respective quality of service option selected by the respective downloader from the offered quality of service options and the obtained commitments;

collecting, by the central system, payment from the respective downloader for downloading the requested content at the selected quality of service option by the respective downloader and having been uploaded by the determined uploader with quality of service factors satisfying the selected quality of service option;

paying, by the central system, the determined uploader for the content uploaded by the determined uploader an amount determined in accordance with the quality of service option selected by the respective downloader and the quality of service factors actually provided by the determined uploader to upload the requested content, wherein said obtaining, said offering, said determining, said collecting and said paying are performed by at least one computer of the central system.

* * * * *